United States Patent
Konishi et al.

(10) Patent No.: US 6,191,555 B1
(45) Date of Patent: Feb. 20, 2001

(54) CAPACITY LEVELING CIRCUIT FOR A BATTERY GROUP

(75) Inventors: Daisuke Konishi; Yoshihiko Mizuta, both of Kyoto (JP)

(73) Assignee: Japan Storage Battry Co., Ltd., Kyoto (JP)

( * ) Notice: Under 35 U.S.C. 154(b), the term of this patent shall be extended for 0 days.

(21) Appl. No.: 09/538,287

(22) Filed: Mar. 29, 2000

(30) Foreign Application Priority Data

Mar. 29, 1999 (JP) .................................................. 11-086506
Oct. 20, 1999 (JP) .................................................. 11-298001

(51) Int. Cl.[7] .......................... H01M 10/44; H01M 10/46
(52) U.S. Cl. ............................................................. 320/118
(58) Field of Search ................................... 320/110, 112, 320/116, 117, 118, 119, 121, 132

(56) References Cited

U.S. PATENT DOCUMENTS

| | | | |
|---|---|---|---|
| 5,206,578 | * | 4/1993 | Nor ........................................ 320/118 |
| 5,710,504 | * | 1/1998 | Pascual et al. .................... 320/118 X |
| 5,773,958 | * | 6/1998 | Gow et al. ............................ 320/118 |
| 5,821,729 | * | 10/1998 | Schmidt et al. ................. 320/118 X |
| 5,898,291 | * | 4/1999 | Hall .................................. 320/118 X |

* cited by examiner

Primary Examiner—Edward H. Tso
(74) Attorney, Agent, or Firm—Sughrue, Mion, Zinn, Macpeak & Seas, PLLC (57) ABSTRACT

Voltage dividing circuits P1 to P3 are connected between the GND line connected to a battery B and the positive terminals of cells C1 to C3, respectively. Correcting discharging circuits D1 to D3 are connected between an output line on the side of the positive terminal of the battery B and the positive terminals of the cells C1 to C3, respectively. The amounts of discharges of the cells due to the correcting discharging circuits D1 to D3 are set to be equal to those of the cells due to the voltage dividing circuits P1 to P3, respectively, thereby leveling the capacities of the cells.

12 Claims, 7 Drawing Sheets

FIG.7

CAPACITY LEVELING CIRCUIT FOR A BATTERY GROUP

BACKGROUND OF THE INVENTION

1. Field of the Invention

The present invention relates to a capacity leveling circuit which is used for a battery group configured by connecting plural cells in series, in order to level the capacities of the cells.

2. Description of the Related Art

For example, a traction battery for an electric vehicle is configured by a battery group in which a large number of cells are connected in series to provide a desired high voltage. In such a battery system, there is a problem that, when the cells are varied in capacity, voltage, temperature, and the like, the reliability of the battery system is lowered. Therefore, the states of each of the cells, such as the capacity, the voltage, the temperature, and the like are detected to monitor whether the cell is in a given condition or not.

Figure 7:
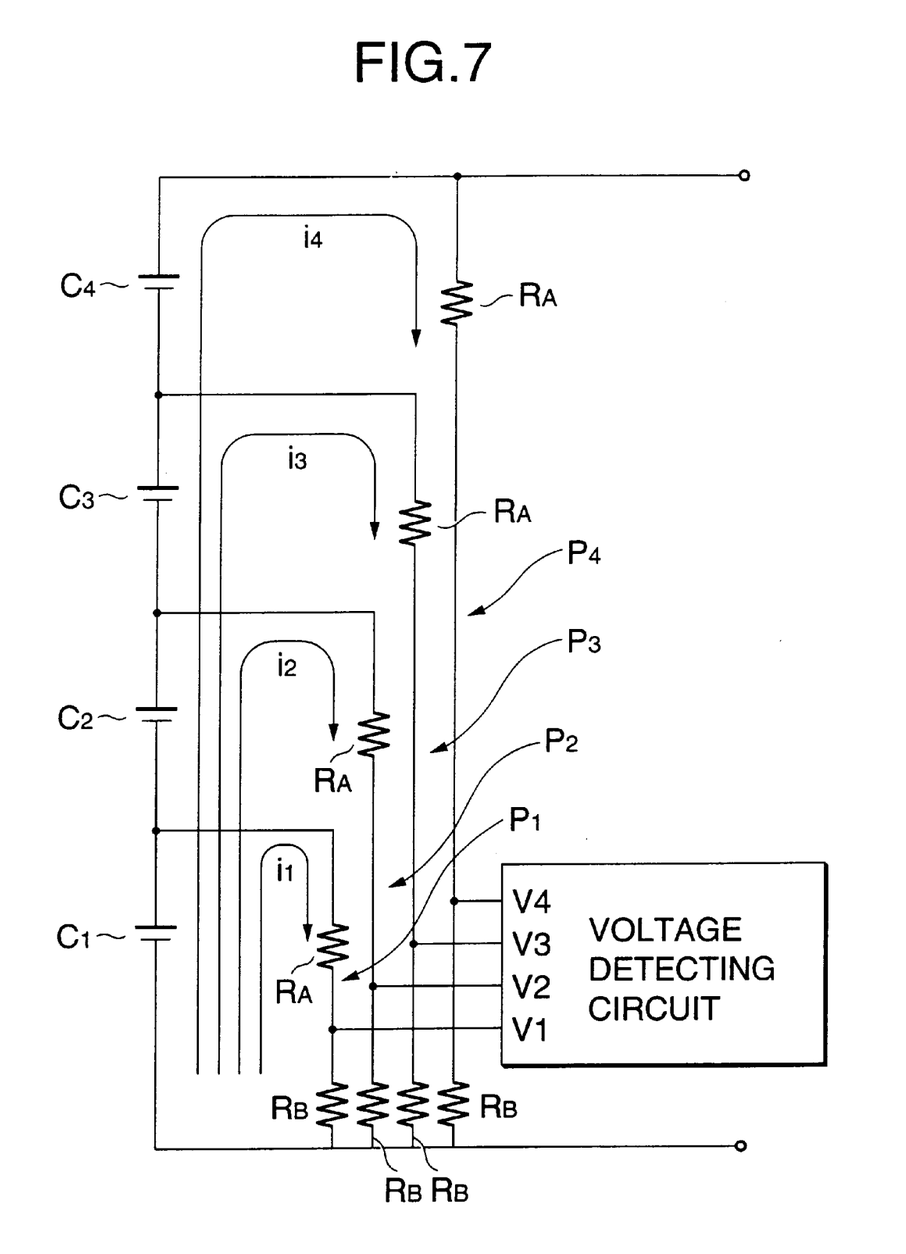
FIG. 7 is a circuit diagram showing an example of the conventional art.

In order to detect the voltage of each of such cells, usually, the configuration shown in FIG. 7 is used. In the figure, for the sake of simplicity, only four cells are illustrated. Voltage dividing circuits P1 to P4 each of which is configured by connecting resistors RA and RB in series are connected between the output terminals of cells C1 to C4 and a ground line serving as one of common output lines, respectively. According to this configuration, the voltages of the cells C1 to C4 can be measured from voltages V1 to V4 appearing at the common junctions between the resistors RA and RB of the voltage dividing circuits P1 to P4, respectively.

When the voltage dividing circuits P1 to P4 are connected to the cells C1 to C4 as described above, there arises a problem in that the capacities of the cells are varied and hence the reliability of the system is lowered. This problem is caused by discharging currents i1 to i4 respectively flowing through the voltage dividing circuits P1 to P4. Namely, the discharging currents have relationships that, as shown in FIG. 7, the discharging current i1 flows through the cell C1 only, the discharging current i2 flows through the cells C1 and C2, the discharging current i3 flows through the cells C1, C2, and C3, and so forth. Consequently, a larger current always flows through the cells C1, C2, ... which are nearer to the ground line. As a result, the capacity of each of the cells is reduced in a larger degree as the cell is nearer to the ground line.

In the case where the battery is of the type in which overcharge does not produce a serious problem, the capacities of the cells C1 to C4 can be leveled by charging the cell C1 the capacity of which is lowered by the largest degree, so as to be fully charged, and the other cells C2, C3, and C4 to be overcharged. In a battery of the type in which overcharge should be avoided, such as a lithium-ion battery, however, the capacities of cells cannot be leveled by the above-mentioned technique.

SUMMARY OF THE INVENTION

The invention has been conducted under these circumstances. It is an object of the invention to provide a capacity leveling circuit for a battery group in which capacities of cells of the battery group can be leveled to enhance the reliability of the system.

<First aspect of the Invention>

According to a first aspect of the invention, in a capacity leveling circuit for a battery group configured by connecting plural cells in series, voltage dividing circuits for measuring voltages of the cells being connected between one of output terminals of the battery group and output terminals on one side of the cells, respectively, a correcting discharging circuit for discharging a cell(s) is connected between another output terminal of the battery group and the one output terminal of each of the cells, one of the voltage dividing circuits being connected to the one output terminal, the cell(s) being not connected to the one voltage dividing circuit in series. The leveling of the capacities of the cells can be realized by setting the amounts of discharges of the cells due to the correcting discharging circuits, and those of each of the cells due to the voltage dividing circuits to be equal to one another.

<Second aspect of the Invention>

According to a second aspect of the invention, in the capacity leveling circuit for a battery group according to the first aspect of the invention, each of the correcting discharging circuits and the voltage dividing circuits is configured by connecting a photo FET and a resistor in series. In other words, each of the voltage dividing circuits is configured by connecting a photo FET 1 and a resistor in series, and each of the correcting discharging circuits is configured by connecting a photo FET 2 and a resistor in series.

Each of the photo FETs is configured by disposing light emitting and receiving diodes in the gate portion, and packaging the transistor and the diodes. Therefore, the gate terminal of the photo FET is insulated from the drain terminal, and the gate voltage is not affected by the drain voltage. In other words, even when the photo FETs have different drain voltages, all the gate voltages required for respectively driving the FETs are equal to one another, so that the on/off states of the FETs can be easily controlled.

<Third aspect of the Invention>

According to a third aspect of the invention, in the capacity leveling circuit for a battery group according to the second aspect of the invention, terminal portions of all the correcting discharging circuits which are commonly connected to the other output terminal of the battery group are formed as a single common line, a single photo FET 2 which is commonly used by all the correcting discharging circuits is disposed in the common line, and a diode is disposed in a portion of each of the correcting discharging circuits except the common line, the diode blocking a current in a direction opposite to a current direction in a case of a turn-on of the photo FET 2, from flowing through the resistor of the correcting discharging circuit.

According to this configuration, the single photo FET 2 can be commonly used by all the correcting discharging circuits, and a reverse current can be prevented from flowing through the correcting discharging circuits by diodes which are more economical than a photo FET. Therefore, the production cost of the circuit can be made lower than that of a circuit in which plural photo FETs are used correspondingly with the correcting discharging circuits.

<Fourth aspect of the Invention>

According to a fourth aspect of the invention, in the capacity leveling circuit for a battery group according to the third aspect of the invention, a ratio of a resistance of each of the voltage dividing circuits to a resistance of each of the correcting discharging circuits is equal to a ratio of a number of cells of the voltage dividing circuit to a number of cells of the correcting discharging circuit, the voltage dividing circuit and the correcting discharging circuit being connected to the one output terminal of a same cell.

According to this configuration, the resistance ratio of a voltage dividing circuit and a correcting discharging circuit which correspond to each other is made equal to the cell number ratio of the circuits, and hence a current flowing through a cell(s) which are connected in series to the voltage dividing circuit is equal in level to that flowing through the a cell(s) which are connected in series to the correcting discharging circuit. As a result, the amounts of discharges of the cells can be equalized with each other simply by setting the turn-on period of the voltage dividing circuit to coincide with that of the correcting discharging circuit.

<Fifth aspect of the Invention>

According to a fifth aspect of the invention, in the capacity leveling circuit for a battery group according to one of the second to fourth aspects of the invention, turn-on periods of the photo FETs 1 of all the voltage dividing circuits coincide with one another.

According to this configuration, the on/off control of the FETs 1 can be easily performed, and the correcting discharge control for leveling the capacities by the on/off operations of the photo FET 2 of the correcting discharging circuits can be simplified.

DETAILED DESCRIPTION OF THE PREFERED EMBODIMENT

<First embodiment>

Figure 1:
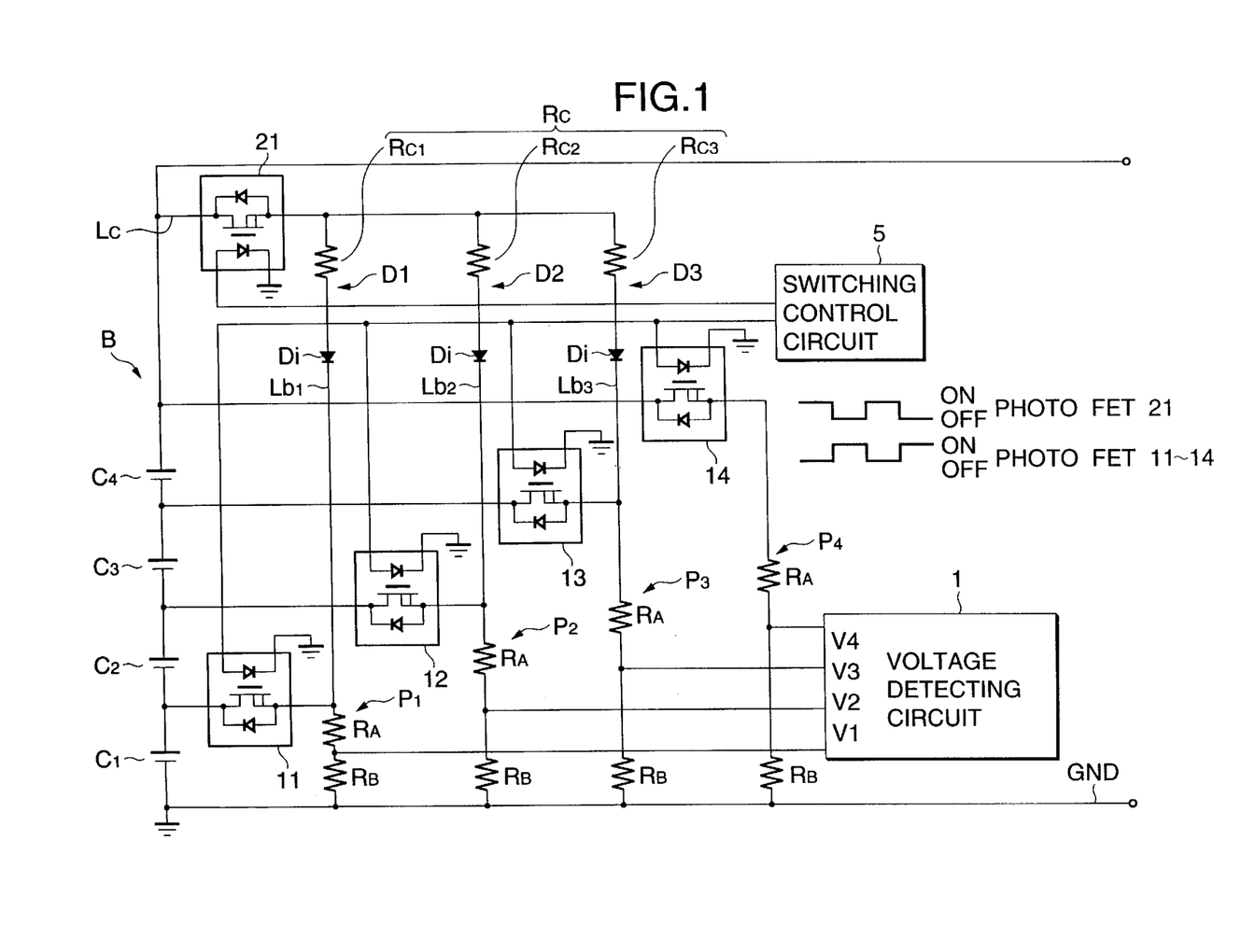
FIG. 1 is a circuit diagram showing a first embodiment of the invention.

Hereinafter, a first embodiment in which the invention is applied to, for example, a traction battery system for an electric vehicle will be described with reference to FIGS. 1 to 4. A battery B corresponding to a battery group in the invention is configured by connecting plural cells in series. For example, the negative output terminal of the battery is connected to a ground line GND. In the figure, for the sake of simplicity, only four cells are illustrated. Voltage dividing circuits P1 to P4 each of which is configured by connecting resistors RA and RB in series are connected between the positive output terminals of cells C1 to C4 and the ground line GND, respectively. In all the voltage dividing circuits P1 to P4, the resistors RA and RB are configured in the same manner so as to attain the same voltage division ratio. In the voltage dividing circuits P1 to P4, the common junction of the resistors RA and RB is connected to a voltage detecting circuit 1 which detects voltages VC1 to VC4 of the cells C1 to C4 in accordance with the following expressions:

$VC1=k \cdot V1$ $VC2=k \cdot (V2-V1)$ $VC3=k \cdot (V3-V2)$ $VC4=k \cdot (V4-V3)$ where k is a proportional constant which depends on the voltage division ratio.

In the voltage dividing circuits P1 to P4, photo FETs 11 to 14 serving as switch elements are connected between the resistor RA and the positive output terminals of the cells C1 to C4 while connecting their drain terminals to the side of the output terminals of the cells C1 to C4, respectively. Each of the photo FETs 11 to 14 is configured by disposing light emitting and receiving diodes in the gate portion, and packaging the transistor and the diodes. In each of the photo FETs 11 to 14, therefore, the gate terminal is insulated from the drain terminal, and the gate voltage is not affected by the drain voltage. In other words, even when the photo FETs 11 to 14 have different drain voltages, all the gate voltages required for respectively driving the FETs are standardized to a rated value (1.3 V) or the forward voltage of the light emitting diode, so that the on/off states of the FETs are easily controlled. The gate terminals of the photo FETs 11 to 14 are connected to a switching control circuit 5, so that the on off states of the FETs are controlled by signals supplied from the circuit, respectively. In the voltage dividing circuits P1 to P4, the on/off control is performed in the same pattern, and at an on-duty ratio of 50% as shown in the upper right portion of FIG. 1.

Correcting discharging circuits D1 to D3 respectively corresponding to the voltage dividing circuits P1 to P3 are connected between the positive output terminal of the battery B and the positive output terminals of the cells C1 to C3, respectively. Each of the correcting discharging circuits D1 to D3 is configured by connecting in series a resistor RC (one of RC1 to RC3) serving as a current-limiting element, and a photo FET 21 serving as a switch element.

Specifically, in the three correcting discharging circuits D1 to D3, the terminal portions which are commonly connected to the positive output terminal of the battery B are formed as a single common line, the side opposite to the common line Lc is branched into three branch lines Lb1 to Lb3 respectively corresponding to the correcting discharging circuits D1 to D3, and the branch lines are connected to common junctions between the photo FETs 11 to 13 of the voltage dividing circuits P1 to P3 and the resistors RA, respectively.

The single photo FET 21 which is commonly used by all the correcting discharging circuits D1 to D3 is disposed in the common line Lc. Sets of the resistor RC (one of RC1 to RC3) of the correcting discharging circuits D1 to D3 and a diode Di are disposed in the branch lines Lb1 to Lb3, respectively.

The photo FET 21 is configured in the same manner as the photo FETs 11 to 14 of the aforementioned voltage dividing circuits P1 to P4. The gate terminal of the photo FET is connected to the switching control circuit 5. The switching control circuit 5 supplies to the photo FET 21 a signal which is obtained by inverting the on/off control pattern supplied to the photo FETs 11 to 14, as shown in the upper right portion of FIG. 1.

Each of the diodes Di is connected in series to the corresponding resistor RC, in a direction along which a current opposite in direction to that flowing in the case of the turn-on of the photo FET 21 (hereinafter, such a current is referred to as "reverse current") is blocked from flowing through the resistor RC. In other words, the diodes Di prevent a current from flowing from the voltage dividing circuits P1 to P3 to the resistors RC.

Figure 4:
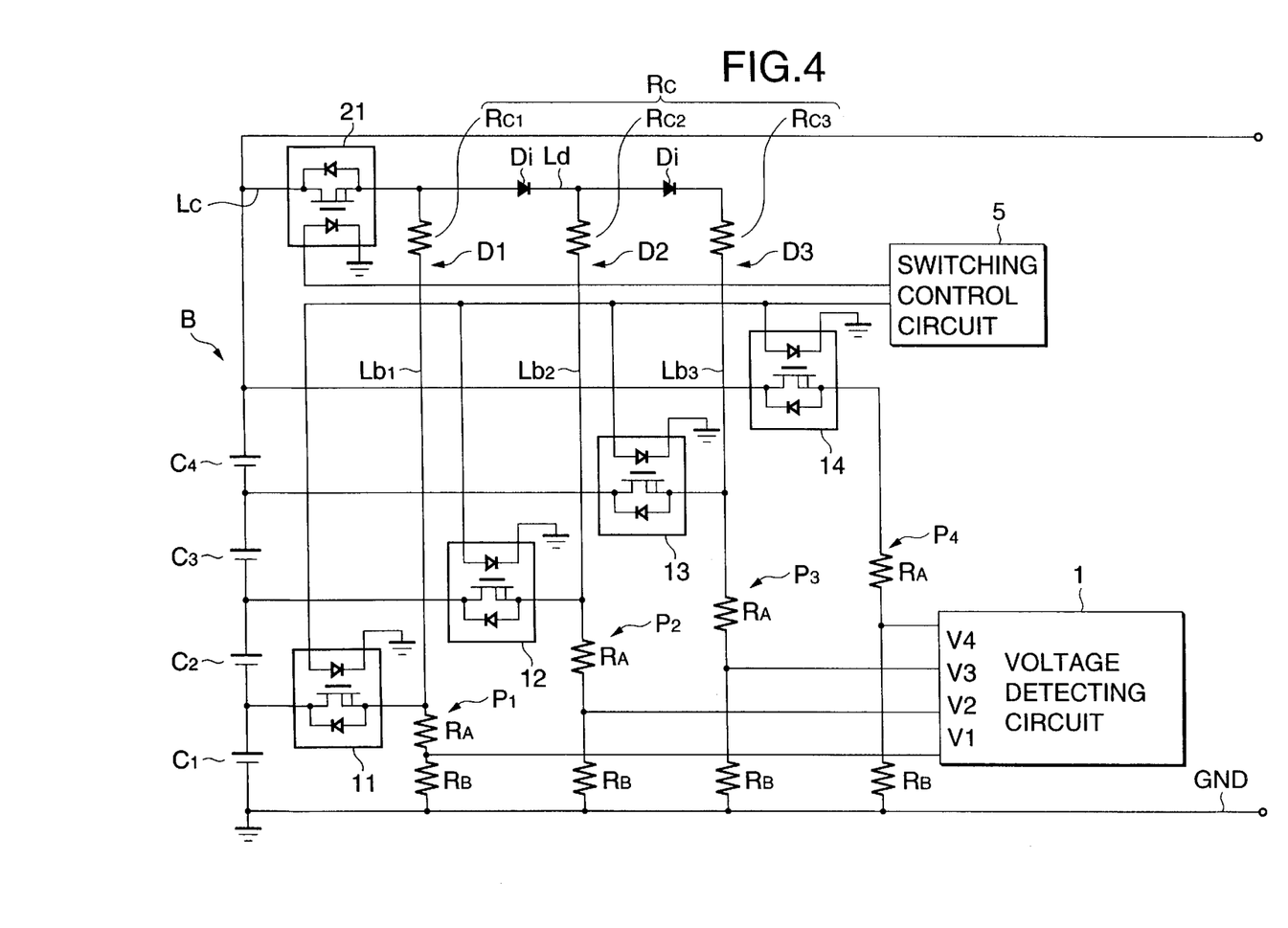
FIG. 4 is a circuit diagram showing a modification of the arrangement of diodes.

As shown in FIG. 4, diodes Di may be respectively disposed in a line Ld which elongates from the common junction of the three branch lines Lb1 to Lb3 toward the two branch lines Lb2 and Lb3, and the branch line Lb3 which is branched from the line Ld, thereby preventing the reverse current from flowing through the lines. By contrast, in the embodiment, the diodes Di are disposed in the branch lines Lb1 to Lb3, respectively. In the embodiment, expressions for strictly obtaining the values of the resistors RC1 to RC3 in consideration of the resistances of the diodes Di can be simplified as compared with those in the case of FIG. 4.

The values of the resistors RC1 to RC3 of the correcting discharging circuits D1 to D3 are set in the following manner. In the pairs of the voltage dividing circuit and the correcting discharging circuit (P1 and D1, P2 and D2, and P3 and D3, see FIGS. 2 and 3) both of which are connected to the output terminal of the same one of the cells C1 to C3, the ratio of the resistances of the circuits is equal to that of the numbers of cells which are connected in series to the respective circuits.

Figure 2:
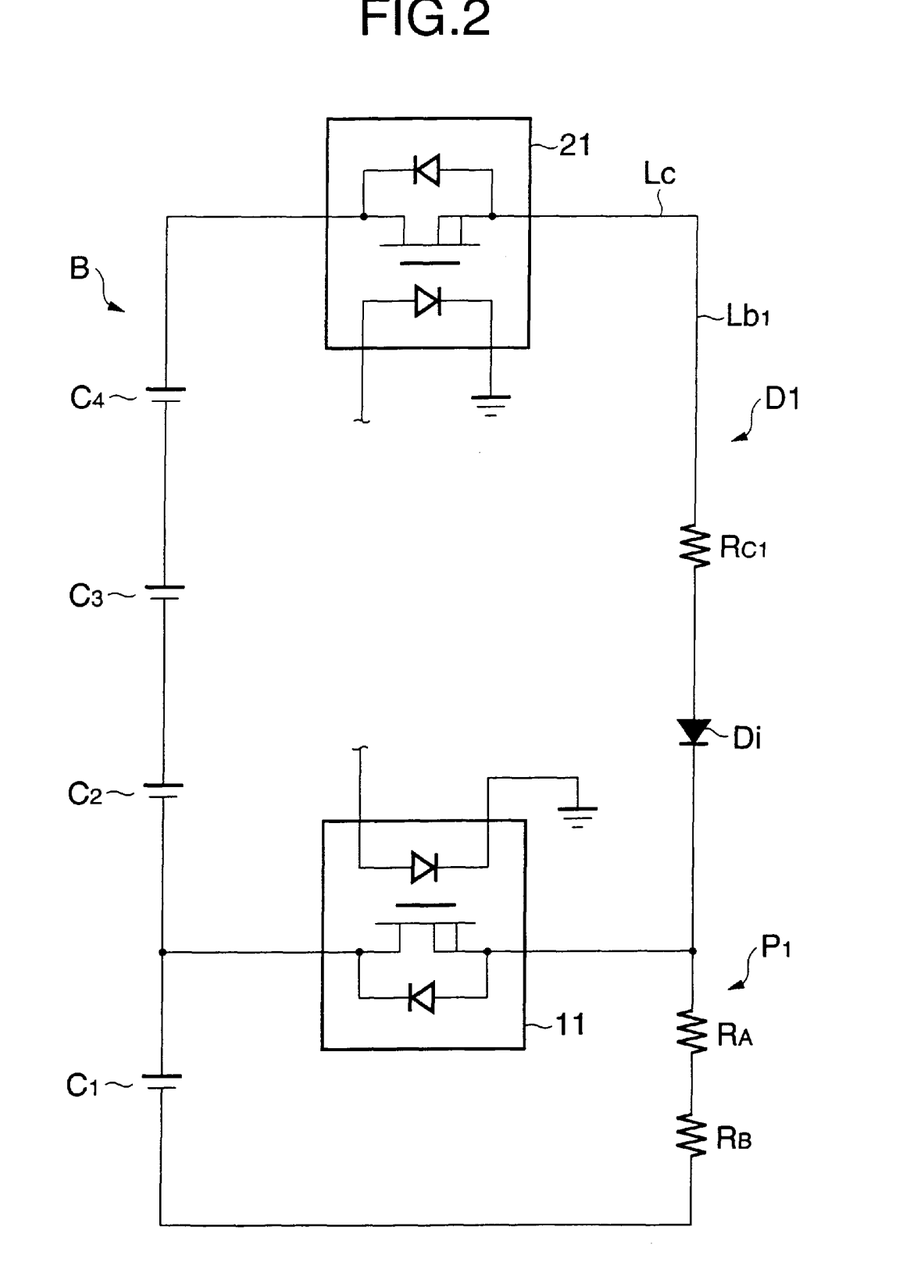
FIG. 2 is a circuit diagram showing a part of the circuit diagram of the first embodiment.

A specific example will be described. FIG. 2 shows only the voltage dividing circuit PI for measuring the voltage of the cell C1, and the correcting discharging circuit D1 corresponding to the voltage dividing circuit P1. One cell is connected in series to the voltage dividing circuit P1, and three cells are connected in series to the correcting discharging circuit D1. Therefore, the cell number ratio of the circuits P1 and D1 is 1:3. Consequently, the resistor RC1 is set to have a value which is obtained by multiplying the resistance (RA+RB) of the voltage dividing circuit P1 by the cell number ratio of 1:3, i.e., RC1=S1·(RA+RB) (where S1=3).

Figure 3:
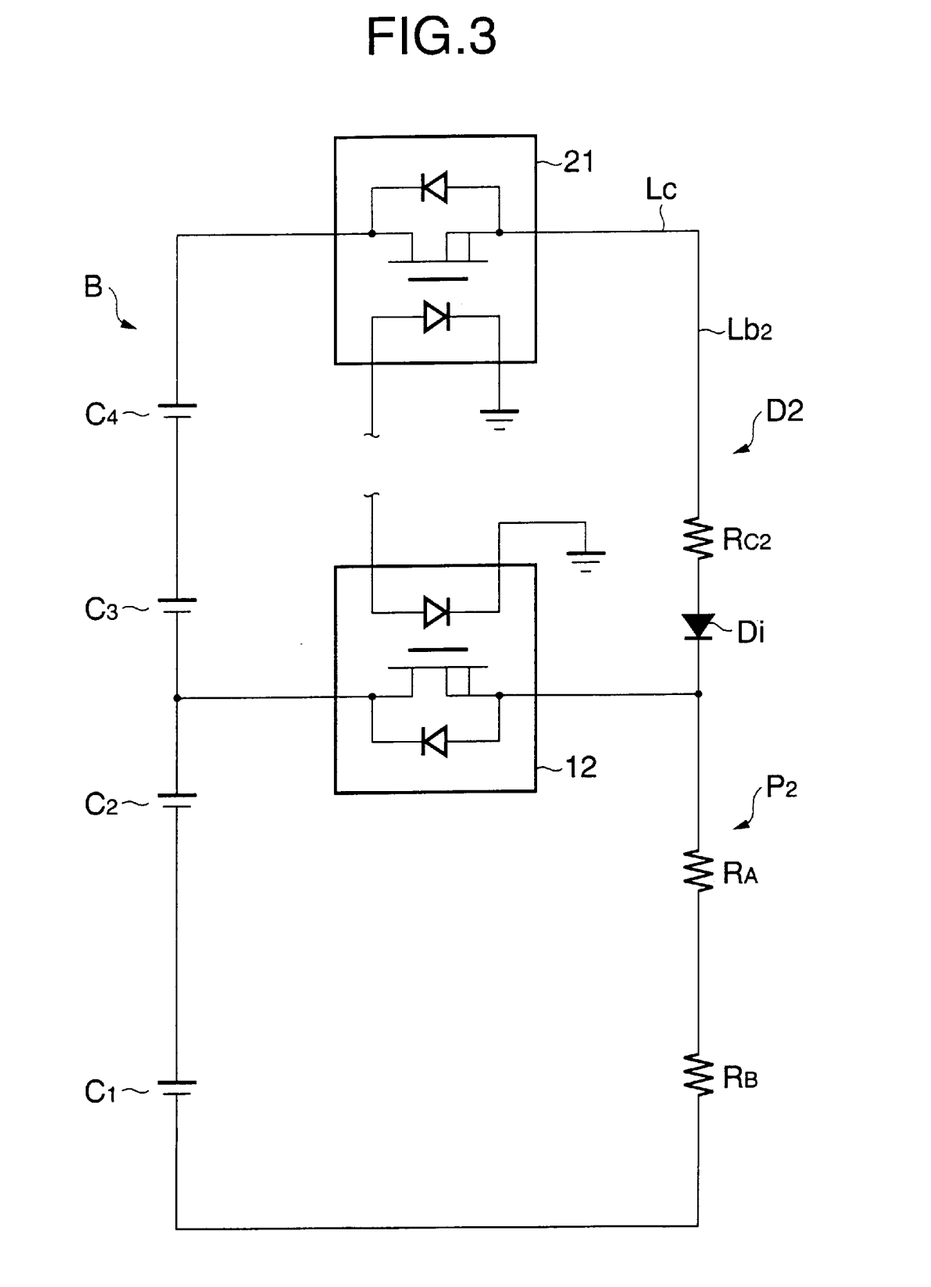
FIG. 3 is a circuit diagram showing a part of the circuit diagram of the first embodiment.

Similarly, the resistors RC2 and RC3 are set as follows:

RC2=S2·(RA+RB) (where S2=1, see FIG. 3)

RC3=S3·(RA+RB) (where S3=1/3).

In the case where the values of the resistors RC1 to RC3 are to be more strictly obtained, the resistors RC1 to RC3 can be obtained from the following three expressions in consideration of the resistances Rd of the diodes Di of the correcting discharging circuits D1 to D3:

RC1=S1·(RA+RB)−Rd

RC2=S2·(RA+RB)−Rd

RC3=S3·(RA+RB)−Rd

The function of the thus configured embodiment will be described.

First, the voltage detecting circuit 1 is activated. In response to the activation, the switching control circuit 5 supplies an on/off signal of an on-duty ratio of 50% to the photo FETs 11 to 14 of all the voltage dividing circuits P1 to P4, and supplies also a signal which is obtained by inverting the on off signal to the photo FET 21 that is common to the correcting discharging circuits D1 to D3.

During the period when the photo FETs 11 to 14 are turned on, a weak current flows through each of the voltage dividing circuits P1 to P4 based on the electromotive forces VC1 to VC4 of the cells C1 to C4. The voltages VC1 to VC4 of the cells C1 to C4 are detected by the voltage detecting circuit 1 from the voltages V1 to V4 appearing at the common junctions between the resistors RA and RB.

At this time, the photo FET 21 is turned off. Therefore, no current flows through the correcting discharging circuits D1 to D3 via the common line Lc. In each of the resistors RC of the correcting discharging circuits D1 to D3, the potential of the terminal connected to the voltage dividing circuit P1, P2, or P3 is higher than that of the terminal on the side of the common line Lc since the photo FET 21 is turned off. However, the diodes Di which are respectively connected in series to the resistors RC prevent a current from flowing from the voltage dividing circuits P1 to P3 into the correcting discharging circuits D1 to D3. Namely, during the period when the voltages VC1 to VC4 of the cells C1 to C4 are detected, no current flows through the correcting discharging circuits D1 to D3.

Hereinafter, for an example, the voltage dividing circuit P1 will be described in detail with reference to FIG. 2. During the detecting operation, the photo FET 11 is turned on, and the photo FET 21 is turned off. Therefore, the current of the voltage dividing circuit P1 flows through the cell C1 which is connected in series to the voltage dividing circuit P1, but does not flow through the cells C2 to C4 which are not connected in series to the voltage dividing circuit P1. As a result, the cell C1 is made different in capacity from the other cells C2 to C4.

When the photo FET 11 is turned off and the cell C1 is isolated from the voltage dividing circuit P1, the photo FET 21 is turned on in synchronization of the turn-off, and the cells C2 to C4 is caused to be connected to the correcting discharging circuit D1 by a parasitic diode formed in the photo FET 11. Then, a current flows through the resistor RC1 in the correcting discharging circuit D1 based on the electromotive forces VC2 to VC4 of the cells C2 to C4, and the cells C2 to C4 are discharged. At this time, the current of the correcting discharging circuit D1 does not flow through the cell C1, and hence the cell C1 is not discharged. Since, with respect to the voltage dividing circuit P1 and the correcting discharging circuit D1, the resistance ratio is equal to the cell number ratio, the current flowing through the cell C1 which is connected in series to the voltage dividing circuit P1 is equal in level to that flowing through the cells C2 to C4 which are connected in series to the correcting discharging circuit D1. Furthermore, the turn-on periods of the photo FETs 11 and 21 are the same time period. Therefore, currents of the same level respectively flow through the voltage dividing circuit P1 and the correcting discharging circuit D1 for the same time period, so that the amounts of discharge of the cells C1 to C4 are equal to one another, whereby the capacities of the cells can be leveled. Similarly, the capacities can be leveled among the cells C1 and C2 which are connected in series to the voltage dividing circuit P2 and the other cells C3 and C4, and among the cells C1, C2, and C3 which are connected in series to the voltage dividing circuit P3 and the other cell C4.

Figure 5:
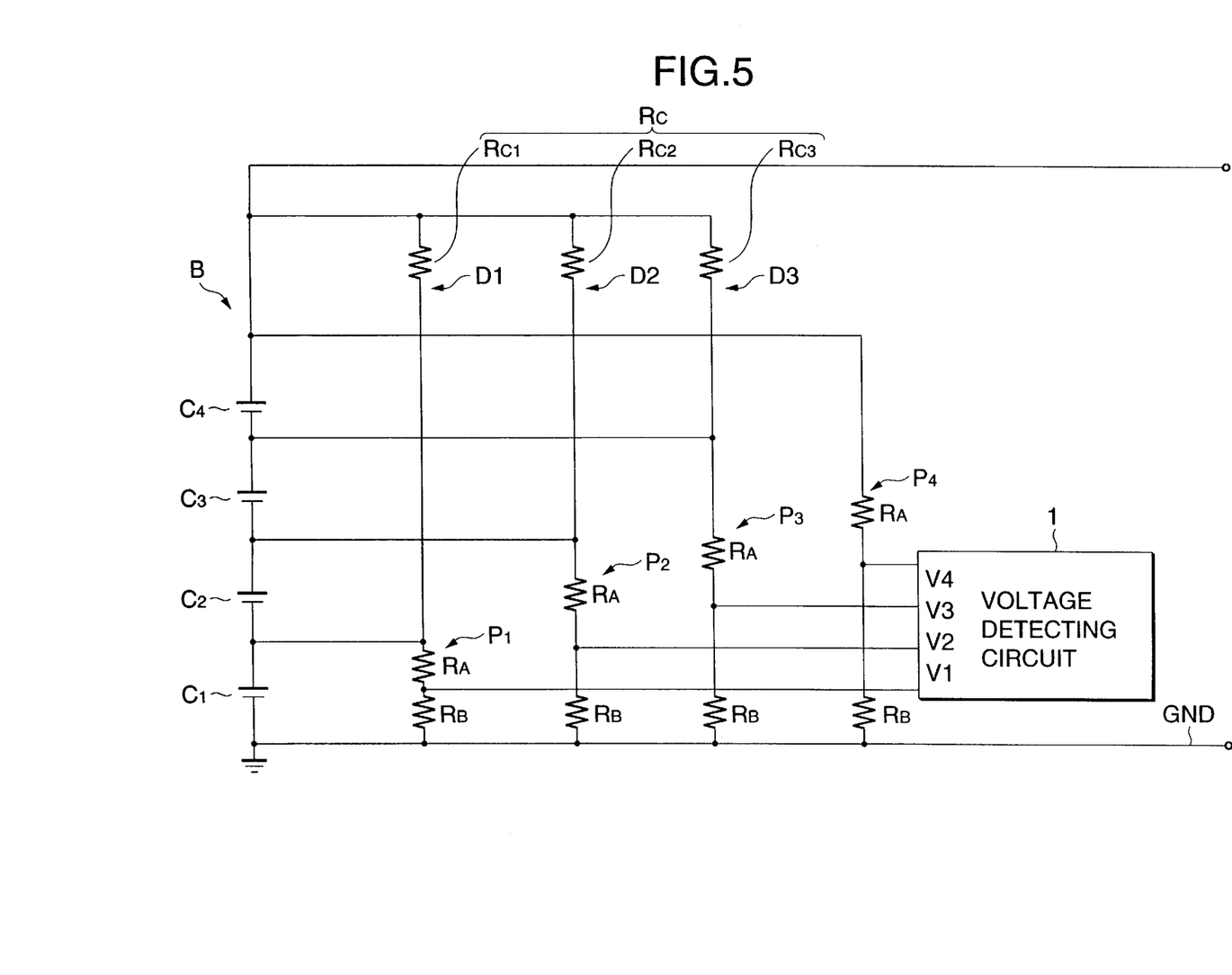
FIG. 5 is a circuit diagram showing a modification of the invention.

In a configuration of FIG. 5 where the photo FETs are removed away from the circuit of the embodiment, for example, it is assumed that the line which rightward elongates from the junction of the cells C1 and C2 in the figure is broken. In this case, the whole voltage of the battery B is applied across the line through which the resistors RC1, RA, and RB are connected in series, thereby producing a fear that the voltage detecting circuit 1 erroneously detects the voltage of the cell C1. By contrast, in the embodiment, the photo FET 21 is always turned off when the photo FET 11 shown in FIG. 2 is turned on. During a period when the voltage detecting circuit 1 detects the voltage of the cell C1, therefore, the whole voltage of the battery B is not applied across the line through which the resistors RC1, RA, and RB are connected in series, and the voltage detecting circuit 1 detects the voltage of the cell C1 to be 0 volt. As a result of the detection of 0 volt, it is possible to detect the occurrence of the breakage of the line.

When the operation of the voltage detecting circuit 1 is stopped, all the photo FETs 11 to 14, and 21 are turned off.

According to this configuration, discharges of the cells C1 to C4 relating to the resistors RA, RB, and RC can be completely prevented from occurring.

As described above, according to the embodiment, the amount of discharges of each of the cells due to the correcting discharging circuits D1 to D3 is set to be equal to that of each of the cells due to the voltage dividing circuits P1 to P3, and hence the leveling of the capacities of the cells can be realized.

In other words, in the embodiment, the differences among the amounts of discharges of the cells C1 to C4 due to the voltage dividing circuits P1 to P3 are compensated with discharges due to the correcting discharging circuits D1 to D3, whereby capacity variations among the cells which are mainly caused by discharges through the voltage dividing circuits can be prevented from occurring. Consequently, it is possible to attain an effect that capacity variations among the cells which are produced by another cause such as deterioration can be surely detected.

In the embodiment, since the turn-on periods of the photo FETs 11 to 14 of all the voltage dividing circuits P1 to P4 are set to be equal to each other, all the FETs can be operated by a common on/off signal, so that the on/off control of the FETs can be easily performed. Since the turn-on periods of the correcting discharging circuits D1 to D3 coincide with those of the voltage dividing circuits P1 to P4, the on/off control can be further easily performed.

In the embodiment, the single photo FET 21 is commonly used by all the correcting discharging circuits D1 to D3, and a reverse current is prevented from flowing through the correcting discharging circuits D1 to D3 by the diodes Di which are more economical than a photo FET. Therefore, the production cost of the circuit can be made lower than that of a circuit in which plural photo FETs are used correspondingly with the correcting discharging circuits D1 to D3.

<Second embodiment>

Figure 6:
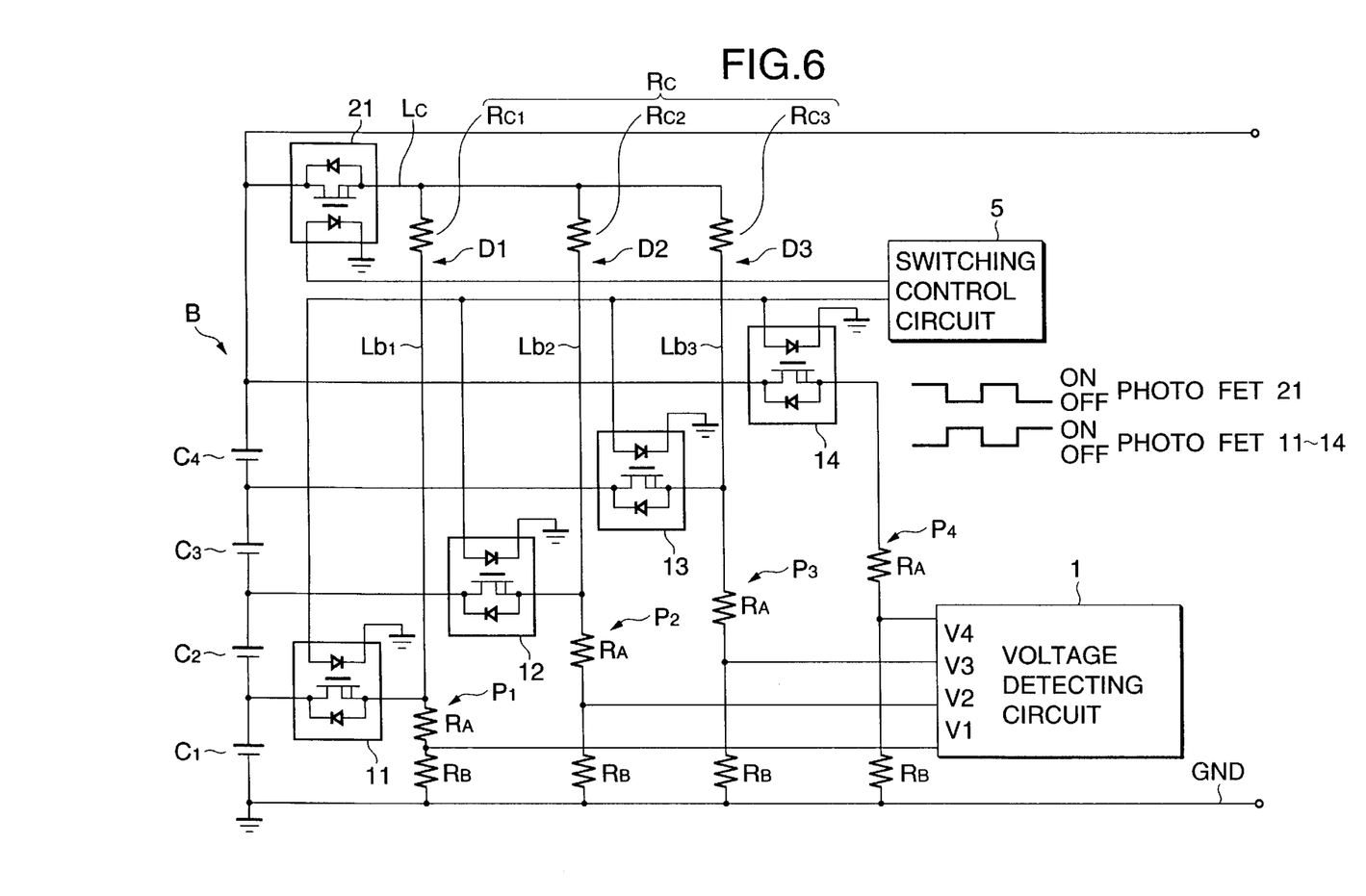
FIG. 6 is a circuit diagram showing a second embodiment of the invention.

FIG. 6 shows a second embodiment in which the signals supplied from the switching control circuit to the photo FETs are configured differently from those in the first embodiment. In the embodiment, furthermore, each of the correcting discharging circuits is not provided with a diode. The other configuration is identical with that of the first embodiment. Therefore, the identical components are denoted by the same reference numerals, and duplicated description is omitted.

As shown in the upper right portion of FIG. 6, the switching control circuit 5A in the embodiment supplies the same signal (for example, the on/off signal of an on-duty ratio of 50%) as that supplied to the photo FETs 11 to 14 of the voltage dividing circuits P1 to P4, to the photo FET 21 of the correcting discharging circuits D1 to D3.

According to this configuration, during the period when the photo FETs 11 to 14 of the voltage dividing circuits P1 to P4 are turned on and the detecting operation is performed, also the photo FET 21 of the correcting discharging circuits D1 to D3 is turned on, so that, in each of the resistors RC of the correcting discharging circuits D1 to D3, the potential of the terminal on the side of the common line Lc is higher than that of the terminal connected to the voltage dividing circuit P1, P2, or P3. Even when diodes are not disposed unlike the first embodiment, therefore, it is possible to prevent a reverse current from flowing through the resistors RC of the correcting discharging circuits D1 to D3.

According to the embodiment, the leveling of the capacities of the cells can be realized in the same manner as the first embodiment, and diodes are not required to be disposed, while the photo FET 21 is commonly used by the correcting discharging circuits D1 to D3.

<Other embodiments>

The invention is not restricted to the embodiments which have been described above with reference to the drawings. For example, the following embodiments also are within the technical scope of the invention, and other various modifications can be made without departing from the spirit and scope of the invention.

(1) In the first and second embodiments, the photo FET 21 is commonly used by all the correcting discharging circuits D1 to D3. Alternatively, photo FETs may be disposed in the correcting discharging circuits D1 to D3, respectively. In the alternative, naturally, it is not necessary to dispose the diodes Di of the first embodiment.

(2) In the embodiments described above, in each corresponding pair of the voltage dividing circuits P1 to P3 and the correcting discharging circuits D1 to D3, the resistance ratio is made equal to the cell number ratio. Alternatively, for example, a configuration may be employed in which the resistance ratio of a voltage dividing circuit and a correcting discharging circuit that correspond to each other may be set to be twice the cell number ratio of the circuits, and the correcting discharging circuit may be turned on for a period which is half the turn-on period of the voltage dividing circuit, thereby equalizing the amounts of discharge of the cells.

(3) As shown in FIG. 5, switch elements (photo FETs) may be removed away from the embodiments to constitute a configuration in which a weak current always flows through the voltage dividing circuits and the correcting discharging circuits.

What is claimed is:

1. A capacity leveling circuit for a battery group comprising:

a battery group formed of a plurality of cells in series;

voltage dividing circuits connected between one of output terminals of said battery group and output terminals on one side of said cells; and, correcting discharging circuits connected between another output terminal of said battery group and said one output terminal of each of said cells, one output terminal of each of said cells being connected to voltage dividing circuits;

wherein amounts of discharges of each of said cells in said correcting discharging circuits are set to be equal to amounts of discharges of each of cells in said voltage dividing circuits.

2. The capacity leveling circuit for a battery group according to claim 1, wherein said voltage dividing circuit comprising:

at least one first switch element; and, at least one resistor;

wherein, said voltage dividing circuit is configured by connecting said first switch element and said resistor;

said correcting discharging circuit comprising:

at least one second switch element; and at least one resistor;

wherein, said correcting discharging circuit is configured by connecting said second switch element and said resistor.

3. The capacity leveling circuit for a battery group according to claim 2, wherein, said first and second switch elements are photo FETs.

4. The capacity leveling circuit for a battery group according to claim 2, wherein, terminal portions of all said correcting discharging circuits, said terminal portions being commonly connected to the other output terminal of said battery group, are formed as a single common line, said common line has said second FET, said second FET being commonly used by all said correcting discharging circuits, said correcting discharging circuits comprising a diode, said diode being disposed in a of each of said discharging circuits except said common line with blocking a current in a direction opposite to a current direction in a case of a turn-on of said second switch element, from flowing through said resistor of said correcting discharging circuit.

5. The capacity leveling circuit for a battery group according to claims 1, wherein a ratio of a resistance of each of said voltage dividing circuits to a resistance of each of said correcting discharging circuits is equal to a ratio of a number of cells of said voltage dividing circuit to a number of cells of said correcting discharging circuit.

6. The capacity leveling circuit for a battery group according to claims 2, wherein turn-on periods of said first switch elements of all said voltage dividing circuits coincide with one another.

7. The capacity leveling circuit for a battery group according to claims 2, said second switch element is disposed in each of said correcting discharging circuits, respectively.

8. A method of leveling a capacity of a battery group, comprising a step of:

in voltage dividing circuits being connected between one of output terminals of said battery group and output terminals on one side of cells, measuring voltages of said cells respectively;

in correcting discharging circuit being connected between another output terminal of said battery group and said one output terminal of each of said cells, one of said voltage dividing circuits being connected to said one output terminal, said cells being not connected to said one voltage dividing circuit in series, discharging said cells; and, setting the amounts of discharges of said cells in said correcting discharging circuits, and those of each of said cells in said voltage dividing circuits to be equal to one another.

9. The method of leveling a capacity of a battery group according to claim 8, wherein said voltage dividing circuit comprising:

at least one first switch element; and, at least one resistor;

wherein, said voltage dividing circuit is configured by connecting said first switch element and said resistor;

said correcting discharging circuit comprising:

at least one second switch element; and at least one resistor;

wherein, said correcting discharging circuit is configured by connecting said second switch element and said resistor.

10. The method of leveling a capacity of a battery group according to claim 8, wherein, said first and second switch elements are photo FETs.

11. The method of leveling a capacity of a battery group according to claims 9, wherein turn-on periods of said first switch elements of all said voltage dividing circuits coincide with one another.

12. The method of leveling a capacity of a battery group according to claims 9, said second switch element is disposed in each of said correcting discharging circuits, respectively.

* * * * *